United States Patent [19]

Crowley et al.

[11] 4,368,058
[45] Jan. 11, 1983

[54] MAXIMIZING FLOW OF ABSORPTION LIQUID IN ABSORPTION METHODS

[75] Inventors: Ralph P. Crowley; Max D. Pope, both of Bountiful, Utah

[73] Assignee: Phillips Petroleum Company, Bartlesville, Okla.

[21] Appl. No.: 173,526

[22] Filed: Jul. 30, 1980

[51] Int. Cl.³ .............................................. B01D 53/14
[52] U.S. Cl. ......................................... 55/21; 55/23; 55/227; 202/160; 203/2
[58] Field of Search ...................... 55/21, 23, 24, 227; 202/160, 184; 203/1–3

[56] References Cited

U.S. PATENT DOCUMENTS

| | | | |
|---|---|---|---|
| 2,933,901 | 4/1960 | Davison | 62/37 |
| 3,094,482 | 6/1963 | Vineyard | 203/2 X |
| 3,130,027 | 4/1964 | Harper | 62/21 |
| 3,249,519 | 5/1966 | Cabbage et al. | 203/2 |
| 3,268,420 | 8/1966 | Webber et al. | 203/2 |
| 3,401,092 | 9/1968 | Matta | 203/2 X |
| 3,427,228 | 2/1969 | Constantikes et al. | 203/2 X |
| 3,441,485 | 4/1969 | Jones | 203/99 |
| 3,619,377 | 11/1971 | Palmer et al. | 203/2 X |
| 4,075,293 | 2/1978 | Grill et al. | 203/3 X |
| 4,106,916 | 8/1978 | Tuckett et al. | 55/21 |

Primary Examiner—Robert H. Spitzer

[57] ABSTRACT

Flow of lean oil to an absorption section of an absorber is controlled responsive to pressure drop at least a portion of said absorption section. Flow of lean oil can be maximized, short of flooding, responsive to said pressure differential. Apparatus is also described.

6 Claims, 1 Drawing Figure

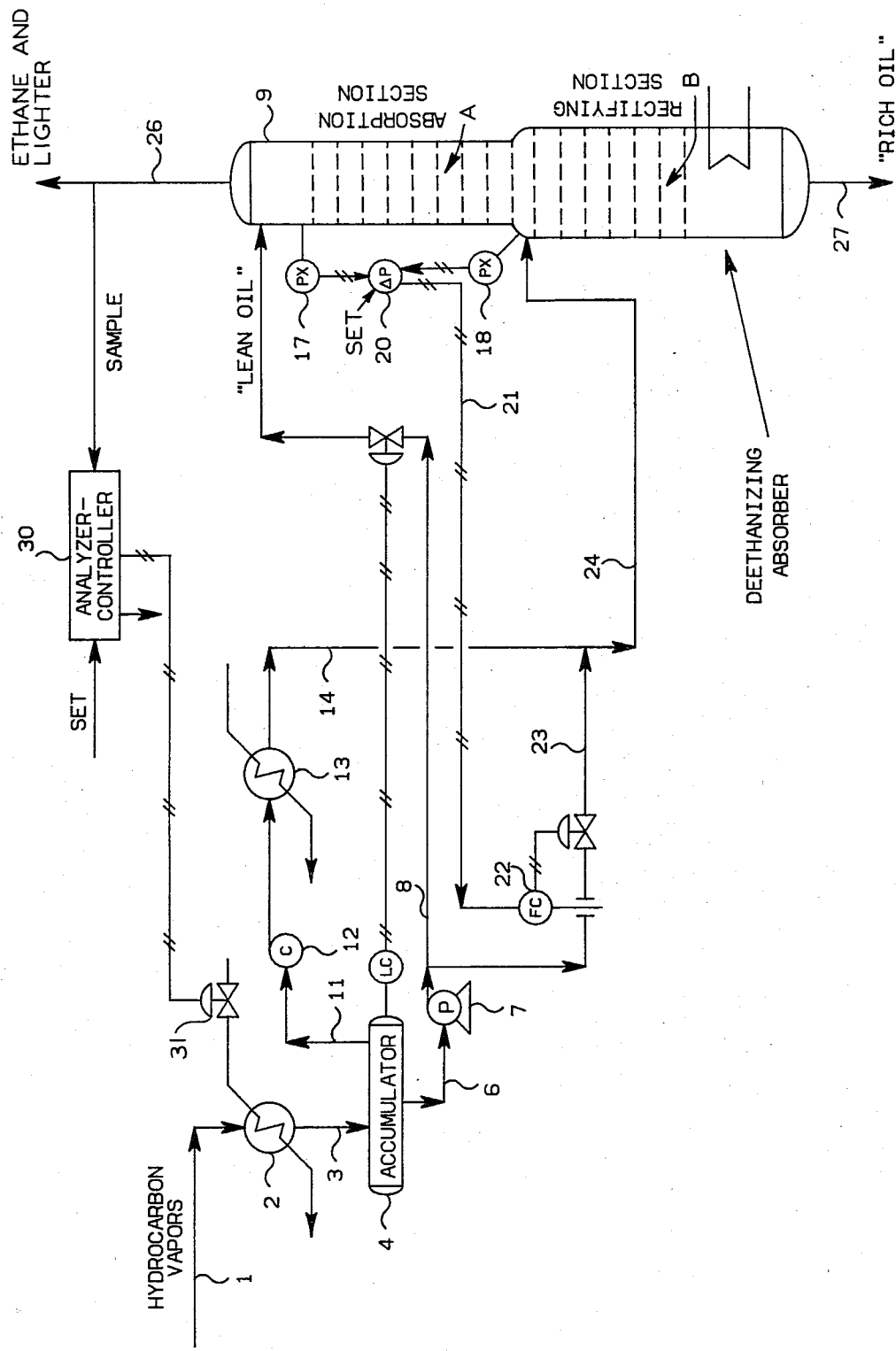

MAXIMIZING FLOW OF ABSORPTION LIQUID IN ABSORPTION METHODS

BRIEF SUMMARY OF THE INVENTION

The pressure drop across an absorption section of a column in which a lean oil is employed to absorb vapors is measured and the rate of flow of lean oil to the absorption section is thus controlled to maximize its flow without flooding of the section.

BRIEF DESCRIPTION OF DRAWING

The drawing shows an embodiment of the invention in which the lean oil or absorption oil is produced from a vapor by condensing a portion thereof and the lean oil thus produced is employed as absorption oil to recover a more readily absorbed portion of the vapors, thus to produce a rich oil.

DETAILED DESCRIPTION

This invention relates to absorption. In one of its aspects, the invention relates to a method of controlling an absorption zone or column in a manner to avoid flooding thereof, yet to maximize the rate of flow of lean oil thereto. Any further aspect of the invention relates to an in situ production of an absorption or lean oil in such a method. It also relates to an apparatus for carrying out such a method.

In one of its concepts, the invention provides a method of controlling an absorption zone or column wherein the rate of flow of lean oil to the column is controlled responsive to the difference in pressure between two points in the tower which are at different levels in said tower. In another of its concepts, the invention provides a method as herein described wherein a mixture of vapors is subjected to conditions to condense a portion thereof to produce a lean or absorption oil and said oil is used to recover from the mixture a further portion of vapors to produce a rich oil. A further concept of the invention is to provide an apparatus comprising an absorption column, an absorption section in said column, a rectifying section in said column, an absorption liquid inlet to said absorption section, means for controlling flow of said liquid to said absorption section, means for measuring pressure drop across at least a portion of said absorption section, and means responsive to said pressure drop to adjust said means for controlling flow of said liquid to said absorption section.

It is desirable to maximize the flow of lean or absorption oil to at least the absorption section of an absorber tower, thus to maximize the recovery of a portion of a mixture of vapors, thus to produce better separation while maintaining maximum possible conditions of flow of absorption liquid and of vapors to be subjected to the absorption to be practiced.

It has now occurred to us that it is possible to correlate the pressure differential or pressure drop across at least a portion of an absorption section of an absorber tower with the rate of flow of lean oil thereinto, thus to provide maximum flow of lean oil while avoiding flooding of the tower.

It will be evident to one skilled in the art in possession of this disclosure having studied the same that the specific gravity of the lean oil at the temperature of operation of the tower will be a factor to consider. Other factors can be involved. For example, the bubbling up of vapors through a layer or layers of absorption oil will lighten the apparent specific gravity of the oil. It is necessary to take this kind of factor into account in the design and/or operation of the method of the invention. Still other factors can be involved. For example, the specific structure or configuration and relative dimensions of plates, downcomers, etc. should be taken into account where appropriate.

It is an object of this invention to provide a method of operation of a vapor absorption in which an absorption oil is used to absorb at least a portion of a vapor mixture. It is another object of the invention to provide an apparatus to accomplish such an absorption. It is a further object of the invention to produce in situ a lean oil.

Other aspects, concepts, objects, and several advantages of the invention are apparent from a study of this disclosure, the drawing and the appended claims.

According to the invention, there is provided a method as well as an apparatus for effecting an absorption operation which comprises in an absorption zone to which there are fed an absorption oil or medium and a vapor, at least a portion of which is to be absorbed, and in which said medium and vapor are brought into intimate contact to effect the desired absorption, determining or measuring at least periodically the pressure drop across at least a portion of said absorption zone and adjusting the rate of flow of said medium responsive to said pressure drop to avoid flooding of said absorption zone but to maintain maximum possible flow of said medium to said absorption zone by reducing the flow of said medium when the liquid in said absorption zone is tending to increase to reach incipient flooding and increasing the rate of flow of said medium to said absorption zone when the liquid in said zone is tending to fall away from incipient flooding, while at the same time maintaining a maximum flow of vapor to said absorption zone, limited only by the desired analysis of the vapor taken off overhead from said absorption zone.

Also according to the invention, there is provided a method, as described, wherein the overhead from the absorption zone is analyzed and the flow of vapors is controlled responsive to analysis thus obtained; the rate of flow of vapors to said absorption zone being increased when purity of the overhead is higher than desired and the rate of flow to said absorption zone being decreased when the purity of the overhead is below that desired.

Thus it can be seen that, according to the method of the invention, a maximum amount of lean oil is passed into the absorption zone, without flooding the same, while at the same time, a maximum amount of vapor is processed in the absorption zone.

Further according to the invention, the apparatus comprises in combination an absorption tower having an absorption section and a rectifying section, a lean absorption oil or medium inlet in the top portion of said absorption section, a vapor inlet at a locus just below said absorption section, means for detecting the pressure differential across at least a portion of said absorption section, and means for adjusting the flow of absorption medium to said absorption section responsive to detected pressure differential.

Still further, the invention comprises means for analyzing overhead from the absorption section and means for controlling the flow of vapors to the absorption operation responsive to analysis of the overhead.

Referring now to the drawing, there is shown an embodiment in which the lean oil is obtained from a hydrocarbon vapor from which there is to be absorbed at least a certain portion, thus to produce an overhead of a desired purity. The hydrocarbon vapor is cooled and condensed, thus to form the lean oil and vapors which are compressed and form the vapors to be subjected to the absorption with the lean oil.

Hydrocarbon vapor is passed by 1 through cooler 2. The cooled hydrocarbon now constituted by a mixture of liquid and vapor is passed by 3 into accumulator 4. Liquid is taken by 6, passed by pump 7 and 8 through a valve into the top of absorber tower 9. The valve in the lean oil line is on liquid level control. Conditions are adjusted to maintain the desired liquid level in the accumulator while feeding whatever maximum amount of lean oil to the tower can be effected under the conditions of the invention.

Vapor is taken from accumulator 4 by 11 and passed through compressor 12 and cooler 13 and by 14 and 24 to the absorber tower as shown. Valve 31 is controlled by analyzer controller 30 which also controls the coolant to cooler 2.

Pressure sensors 17 and 18 are operatively connected to differential pressure controller 20 from which signal 21 controls flow control 22 which in turn controls valve in line 23 from which excess lean oil is passed by line 24 into the bottom or rectifying section of tower 9.

When lean oil and vapor are at maximum desired flows, valve 31 is operated to maintain desired flow of vapor. Thus if the purity of the overhead is tending to reduce below that desired, valve 31 will be signalled by analyzer controller 30 to open some. If the purity is tending to be above that desired, valve 31 will be correspondingly close some.

Whenever the pressure differential is tending to increase above a desired value which is that for conditions of operation of the absorption section which is just at incipient flooding or maximum use of lean oil possible under such conditions, flow controller 22 will operate to prevent increase of lean oil through 8 to tower 9.

It is within the scope of the invention to premix excess lean oil with vapors and to introduce the mixture into a locus below the absorption section, i.e., into the rectifying section of tower 9.

One skilled in the art in possession of this disclosure having studied the same will recognize that some variation and/or modification of the controls or points at which controls are exercised can be made while still accomplishing the essence of the invention as herein described.

The invention is applicable to the processing of various hydrocarbon streams. Such streams can be obtained from a fractionator such as a crude oil distillation column, a synthetic crude tower of a catalytic cracking operation, etc. Depending upon the hydrocarbon stream treated and the design of the tower, the absorption section or section A and the rectifying section, i.e. section B, will be juxtapositioned as shown and there will be provided space for disengagement of the vapor from the excess oil in that operation of the invention in which the excess oil is admixed with the vapor before the vapor is admitted to the rectifying section or section B. Preferably, as now considered to be the past mode of operation, the vapors are to be substantially fully disengaged from any oil admixed therewith prior to rising into the absorption section A for best operation of that section.

The following is a calculated example.

EXAMPLE

| Flows | |
| --- | --- |
| Hydrocarbon Vapor 1: | |
| Standard Cubic Feet/Hour | 385,000 |
| Temperature, °F. | 285° |
| Pressure, psig | 9 |
| Composition, volume % | |
| Ethane and Lighter 21% | |
| Propane and Heavier 79% | |
| Hydrocarbon Liquid 6: | |
| Barrels/Hour | 210 |
| °API at 60° F. | 59 |
| Charged via 8: | |
| Barrels/Hour | 190 |
| Charged via 16: | |
| Barrels/Hour | 20 |
| Vapor 14 | |
| Standard Cubic Feet/Hour | 225,000 |
| Temperature, °F. | 110 |
| Pressure, psig | 220 |
| Ethane and Lighter 26: | |
| Standard Cubic Feet/Hour | 100,000 |
| Volume % Ethane | 11 |
| Rich Oil 27: | |
| Barrels per Hour | 250 |
| III Normal Operating Conditions | |
| Accumulator 4: | |
| Temperature, °F. | 70 |
| Pressure, psig | 8 |
| Deethanizing Absorber 9: | |
| Absorption Section: | |
| Top Temperature, °F. | 120 |
| Bottom Temperature, °F. | 110 |
| Pressure at 17, psig | 205 |
| Pressure at 18, psig | 210 |
| $^{(a)}\Delta P$, psi (no flooding) | 5 |
| Rectifying Section: | |
| Top Temperature, °F. | 110 |
| Bottom Temperature, °F. | 235 |
| Top Pressure, psig | 210 |
| Bottom Pressure, psig | 215 |

$^{(a)}$When pressure differential goes above 7 psi, in this illustrative run, indicating incipient flooding, a portion of liquid 6 is passed via 24 to the rectifying section bypassing the absorption section.

Reasonable variation and modification are possible within the scope of the foregoing disclosure, the drawing and the appended claims to the invention, the essence of which is that a maximum flow of lean oil to an absorption section is maintained by measuring pressure drop across at least a portion of that section and employing the pressure drop to maintain a lean oil flow or maximized oil flow without, however, flooding, permitting the introduction of maximum vapor to said section consistent with a desired overhead purity; that a modification in which the lean oil is produced in situ from a hydrocarbon vapor to be processed has been set forth; and that apparatus for carrying out the method of the invention has also been set forth.

We claim:

1. A method for controlling an absorption column comprising:
   (a) subjecting a mixture of vapors to conditions sufficient to condense a portion thereof to produce a lean absorption liquid,
   (b) passing said lean absorption liquid to an absorption section of said absorption column,
   (c) controlling the flow rate of said lean absorption liquid to said absorption section in response to a difference in pressure between two points at different levels in said absorption section, and (d) contacting uncondensed vapors of said mixture of vapors with said lean absorption liquid in said absorption section.

2. A method in accordance with claim 1 wherein maximum flow of lean absorption liquid to said absorption section, short of flooding, is maintained.

3. A method in accordance with claim 1 wherein excess lean absorption liquid is admixed with at least a portion of said uncondensed vapors and passed to said absorption column.

4. A method in accordance with claim 3 wherein said absorption column comprises an absorption section and a rectifying section and wherein said mixture of excess lean oil and uncondensed vapors is passed to said rectifying section.

5. A method in accordance with claim 3 wherein said vapors are hydrocarbon vapors and said lean absorption liquid is lean absorption oil.

6. An apparatus which comprises:
(a) an absorption column comprising an absorption section and a rectifying section,
(b) a lean absorption liquid inlet to said absorption section,
(c) means for condensing a mixture of vapors to produce lean absorption liquid,
(d) means for controlling the flow of said lean absorption liquid to said absorption section in response to a pressure differential between two points at different levels in said absorption section and
(e) means for combining excess lean absorption liquid and uncondensed vapors and for passing said mixture to said rectifying section.

* * * * *